United States Patent [19]
Coden et al.

[11] Patent Number: 5,873,080
[45] Date of Patent: Feb. 16, 1999

[54] USING MULTIPLE SEARCH ENGINES TO SEARCH MULTIMEDIA DATA

[75] Inventors: Anni Rosa Coden, Riverdale; Sue-Wen Mak, Yorktown Heights; Edward Cholchin So, Flushing, all of N.Y.

[73] Assignee: International Business Machines Corporation, Armonk, N.Y.

[21] Appl. No.: 827,318

[22] Filed: Mar. 26, 1997

Related U.S. Application Data

[60] Provisional application No. 60/033,025 Dec. 17, 1996.
[51] Int. Cl.⁶ .................................................. G06F 17/00
[52] U.S. Cl. ..................... 707/3; 707/4; 707/5; 707/6; 707/1.02; 707/104
[58] Field of Search ................ 707/1–206; 348/714–720

[56] References Cited

U.S. PATENT DOCUMENTS

| | | | |
|---|---|---|---|
| 5,634,051 | 5/1997 | Thomson | 707/5 |
| 5,659,732 | 8/1997 | Kirsch | 707/5 |
| 5,703,655 | 12/1997 | Corey et al. | 348/468 |

OTHER PUBLICATIONS

R. Fagin, Combining Fuzzy Information from Multiple Systems, Proc. 15th ACM Symp. on Principles of Database Systems, Montreal, 1996, pp. 216–226. (Pages renumbered 1–31.).

A. Pentland, R. W. Picrd and S. Sclaroff "Photobook: Tools for Content–Based Manipulation of Image Databases", MIT, SPIE vol, 2368, Image & Information Systems (1994) pp. 37–50.

W. Niblack, R. Barber, W. Equitz, M. Flickner, E. Glasman, D. Petkovic, P. P. Yanker, C. Faloutsos and G. Taubin, IBM Research Division, Almaden Research Center, San Jose, CA, SPIE vol. 1908 (1993), pp. 173–187.

J.P. Callan, W. B. Croft and S. M. Harding, "The INQUERY Retrieval System", Dept. of Computer Science, University of Massachusetts, Amherst, MA, pp. 78–83, No Date.

G. Salton and M. J. McGrill, "Introduction to Modern Information Retrieval", Chapter 4, The SMART and SIRE Experimental Retrieval Systems, cGraw–Hill Book Company, 1983, pp. 118–156.

*Primary Examiner*—Thomas G. Black
*Assistant Examiner*—David Yiuk Jung
*Attorney, Agent, or Firm*—Louis J. Percello

[57] ABSTRACT

A query comprising of sub queries, each of which could be of different media types are used to search a collection of multimedia documents in a database. These sub queries are parsed according to media type and operators/functions between these sub queries are recorded creating a set of query objects and query operator objects. The query interface than passes the query objects to the appropriate application programming interfaces (API's) of the various search engines. Furthermore, it applies the query object operators to the respective interim results obtained by executing a query object. Then the interim results are combined in a global result object that is processed using a user specification to produce a single combined result list that conforms to user specified requirements.

11 Claims, 7 Drawing Sheets

USING MULTIPLE SEARCH ENGINES TO SEARCH MULTIMEDIA DATA

The present application claims priority to U.S. Provisional Application 60/033,025, filed on Dec. 17, 1996 now abandoned.

FIELD OF THE INVENTION

This invention relates to the field of database searching. More specifically, the invention relates to searching a database of multimedia information using multiple search engines.

BACKGROUND OF THE INVENTION

Computers are often used to search and access information from large data bases. Commonly, text search engines are used to search and access text data bases using text queries and/or queries with logical operations on text. There are many systems in the prior art that perform these text searching functions. For example, the SMART system from Cornell and the InQuery engine from the University of Massachusetts at Amherst. See G. Salton and M. J. McGill "Introduction to Modern Information Retrieval" (McGraw-Hill, N.Y., 1983) and J. P. Callan, W. B. Croft, and S. M. Harding, "The INQUERY Retrieval System", Proceedings of the 3rd International Conference on Database and Expert Systems, September, 1992, which are herein incorporated by reference in their entirety.

Recently, computers have been used to store, search, and access multimedia documents from multimedia databases. Multimedia is information that can contain text, images, audio, video, and/or any other type of sensory information. A document (or multimedia document or electronic document) is one or more records of text and/or other multimedia information that is typically viewed at a workstation and/or stored in a multimedia database. The information on any of the records can have multimedia aspects, that is, one or more of the records can contain one or more multimedia types (text, images, video, animation, etc.)

Different types of search engines have been developed in the prior art to handle different types of content.

Images in multimedia documents in a multimedia database are searched and accessed using an image search engine. An image search engine works by first building a database in which a set of features are stored for each image that is indexed. In response to a query, which is expressed in terms of the features of the desired images, the image search engine searches the database for feature sets that most nearly match the query set. The result is a list of the corresponding images. Image search engines in the prior art include QBIC and PictureBook. See Niblack, W., Barber, R., Equitz, W., Flickner, M., Glasman, E., Petkovic, D., Yanker, P., Faloutsos, C., and Taubin, G., "The QBIC project: querying images by content using color, texture, and shape", Proceedings SPIE—International Society of Optical Engineering (USA), Volume 1908, 1993, pages 173–187. See also Pentland, Alexander P., Picard, Rosalind W., and Sclaroff, Stan, "Photobook: tools for content-based manipulation of image databases", Proceedings of SPIE—The International Society for Optical Engineering, Volume 2368, 1995, pages 37–50. Both of these references are herein incorporated by reference in their entirety.

In addition to text and image searching, the prior art contains search engines that search on parameters, also known as attributes. Parametric search engines generally function with tables of data, in which each row in the table represents an object and the columns represent parametric data associated with the object, such as its author or date. A parametric search engine returns a list of the rows which contain the combination of parameters specified in the query.

An example of a parametric search engine is the IBM DATABASE2 (or DB2) relational database system. (IBM and DATABASE 2 are trademarks of the International Business Machines Corporation.)

New technologies, like Digital Libraries, give users access to huge amounts of information, often in the form of multimedia documents, consisting of text, images, sound, and video clips. In many systems, each document can have associated with it, parametric data such as a document number, author, length, price, etc. Users who wish to find relevant documents need to be able to specify conditions on the content (e.g., that the text contains the word "Cadillac" and at least one image, e.g, a picture of a pink car) and/or on parametric data (for example, that the model year is earlier than 1960.)

Searching for particular information in technologies like Digital Libraries, especially over the Internet or the world wide web (WWW), is a formidable task. In general, the prior art allows searching for only one type of multimedia per search request. For example, a text search engine will search text parts which contain text that match a text query item like "Porsche". This text search engine will return a hit list of text parts that contain the words "Porsche." Alternatively, an image search engine will search for images that satisfy an image query item. For instance, an image query item can define shades of red. The image search engine will return hit list of images containing those shades. Also parametric search engines search parameters that describe entire documents and return a hit list of documents that satisfy the parameters in a query item.

Generally in the prior art, a user has to issue a separate query for each media type.

However in the prior art, image and parametric query searches are sometimes used together. In these cases, the parametric queries are used to filter out those documents that do not satisfy the parametric parameters in the query item. The remaining documents are returned in a "parametric hit list" and then a separate image search is done on these remaining documents. In these cases, the information in the documents that do satisfy the parametric search but do not satisfy the image search are lost. For example, a parametric search of "Porsches older than 1994" produces a hit list of Porsches made before that year. An image search defining shades of red, reduces that list to those Porsches produced before 1994 that are red. All documents having information about Porsches older than 1994 but having a color other than red are lost.

Note that the prior art assumes that a logical "AND" operation is performed between the parametric and image searches. No other logical operation between the results of the parametric search and the results of the image search can be performed.

STATEMENT OF PROBLEMS WITH THE PRIOR ART

Using the prior art, a user trying to find one or more multimedia documents that satisfy a query with two or more media types (i.e., a general multimedia query) has to search the data base with a sequence of queries that produce a result that is dependent on the specific media type of the search engine. Except for one instance, the prior art does not allow the user to combine the results of each of these search engines with a general user specification, e.g., general logical combinations. While the prior art lets the user combine parametric and image search results with the restriction that a logical AND operator is applied between the parametric and image results, using the prior art, there is no way to search all the multimedia documents in the data base with a single query that combines general multimedia aspects of the user query, to return a single combined result list. Further, the prior art can not produce a single combined results list for general multimedia queries that apply general logical operators to the combined results list. Also the prior art can not produce a single combined results list that satisfies general multimedia queries and user specified requirements.

OBJECTS OF THE INVENTION

An object of this invention is a system and method that uses a single query, with two or more media types, to search a collection of documents that contain a mixture of media types, in order to return a single combined result list.

An object of this invention is a system and method that uses a single query, with two or more media types, to search a collection of documents that contain a mixture of media types to return a single combined result list conforming to user specified requirements.

An object of this invention is a system and method that uses a single query, with two or more media types, to search a collection of documents that contain a mixture of media types on a network, like the Internet, to return a single combined result list.

SUMMARY OF THE INVENTION

The present invention is a system and method that uses a single query with one or more media types to search a collection of multimedia documents in a database and produce a single combined result. The combined result can be made to conform to user requirements and can be generated by applying general logical operations to the results of the interim results of each of the search engines.

The invention has a combined query section which allows a user to input a single query with more than one media type. The combined query has a query data structure which is submitted to a query interface. The query interface stores the different parts of the query and then parses the query to separate the query according to type. A query object is built for each query type. The query interface translates each of the query objects by query type into queries which are understood by the application programming interface that is designed for a particular search engine. The query interface then distributes the queries to the appropriate search engines. The search of each query type is performed by the appropriate search engine(s) and each search engine returns results which are converted to a collection of result objects. Each result object comprises of a quartet of information: part number, document number, rank and search media type. A global result object is created as a collection of all the individual result objects. The global result object is then passed to a combiner. The combiner is a collection of one or more algorithms that operates on the global result object to produce a single result list. The algorithms have algorithm parameters. Both the algorithms and the algorithm parameters are user selectable and settable to allow a user to chose requirements to which the single result list has to conform. For example, one of the algorithms can include one or more arbitrary logical operations and/or ranking. The single result list has entries that are ranked according to the user requirements.

The invention can be adapted for network (Internet) use. In this case, the user interface will construct an HTML document to present the results to the user.

BRIEF DESCRIPTION OF THE DRAWINGS

The foregoing and other objects, aspects, and advantages of the invention will be better understood from the following detailed preferred embodiments of the invention with reference to the drawings described as follows.

DETAILED DESCRIPTION OF THE INVENTION

Figure 8:
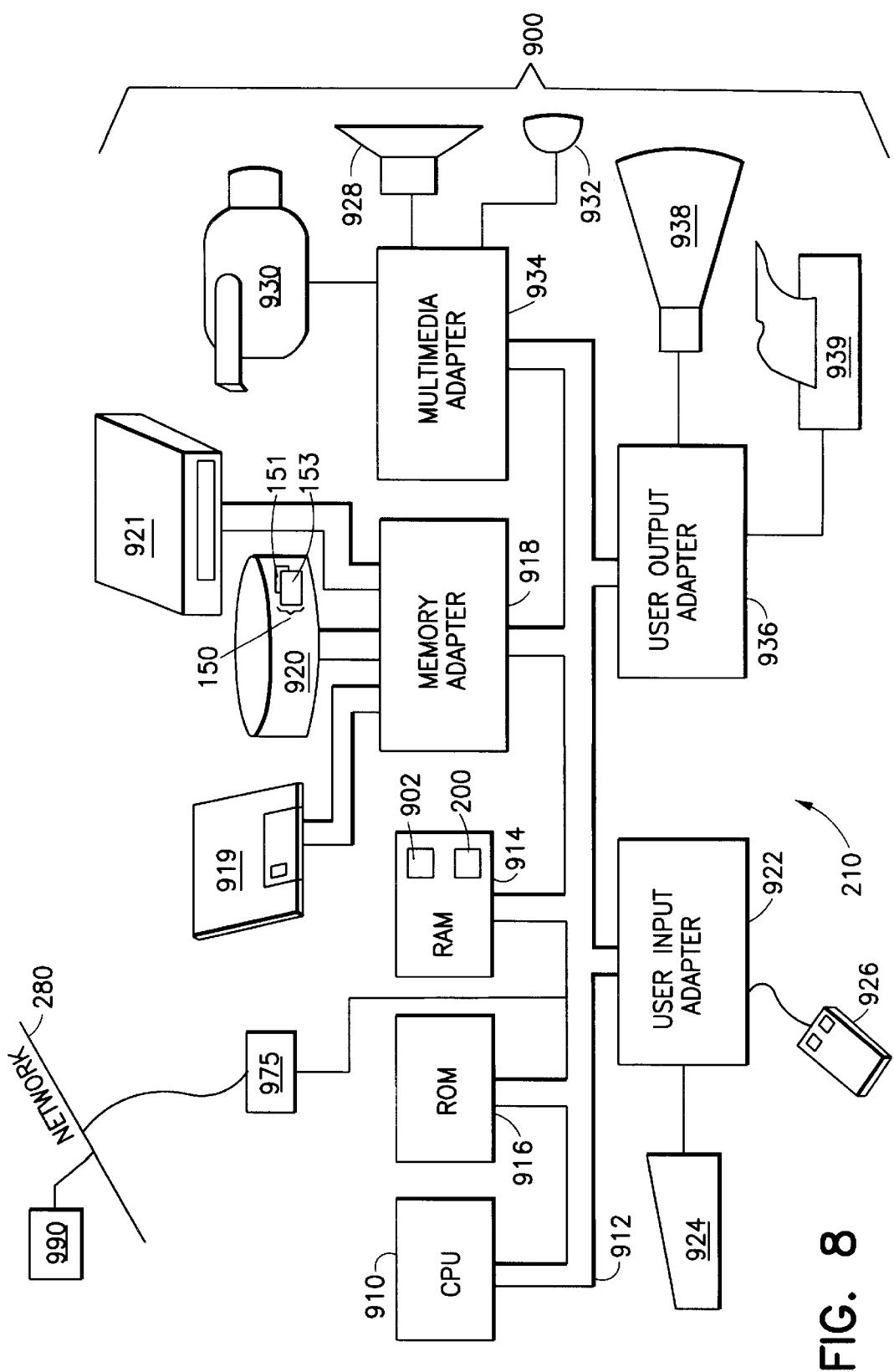
FIG. 8 is a block diagram of alternative hardware embodiments of the present invention.

Referring first to FIG. 8, a block diagram is shown as a non limiting example of a computer system 900, e.g., a RISC System/6000 or an IBM ThinkPad Model 775CX. (RISC System/6000 and ThinkPad are trademarks of the IBM Corporation.) The computer system 900 can be a stand alone computer (210) or a client (210) connected to one or more servers 990 over a network (280). It is readily understood that those skilled in the computer arts will be familiar with many equivalent computer systems (900). Components in the computer system (210) are connected by and communicate over a system bus (912), e.g., a central Processing Unit (CPU) (910), Read Only Memory (ROM) (916), and Random Access Memory (RAM) (914), typically are connected to the system bus (912). The preferred embodiment includes one or more application programs 902, that for example include processes (600) and (700), described below. Additional memory, e.g., diskettes (919), disks (920), and CDROM (921), can be connected to the system bus (912) by appropriate memory adaptors (918). Input/output adaptors (922, 936) connect the system bus (912) to devices that interact with a user. For instance, a keyboard (924) and/or mouse (926) input are connected to the system bus (912) through an appropriate user input adapter (922), just as a display (e.g. a Graphical User Interface, GUI) (938) and/or printer (939) are connected to the system bus (912) through an appropriate User Output Adapter (936). For example, a User Output Adapter 936 used to control a GUI would be an IBM RISC System/6000 Color Graphics Display Adaptor 936. Multimedia functions optionally can be added to the system 900 by using an appropriate Multimedia Adapter (934) like the ActionMedia II Display Adapter (934) (described in the IBM ActionMedia II Technical Reference.) Adapters (934) like this are used to input and output audio signals through audio input devices (e.g. a microphone) (932) and audio output devices (e.g. one or more loud speakers) (928). Video input (e.g. through a camera) (930)

and video output (938) is also enabled by adaptors like these. Speech recognition is accomplished by using an IBM Voice-Type Dictation Adapter (934). User interfaces (922, 936) for other functions, e.g., virtual reality systems, can be connected to the system bus (912). The system (900) can be connected to local or wide area networks (280) (e.g., the Internet) through an appropriate known network interface (975). For an example of communications over a network, see U.S. Pat. No. 5,371,852 to Attanasio et al., issued on Dec. 6, 1994 which is herein incorporated by reference in its entirety.

Figure 1:
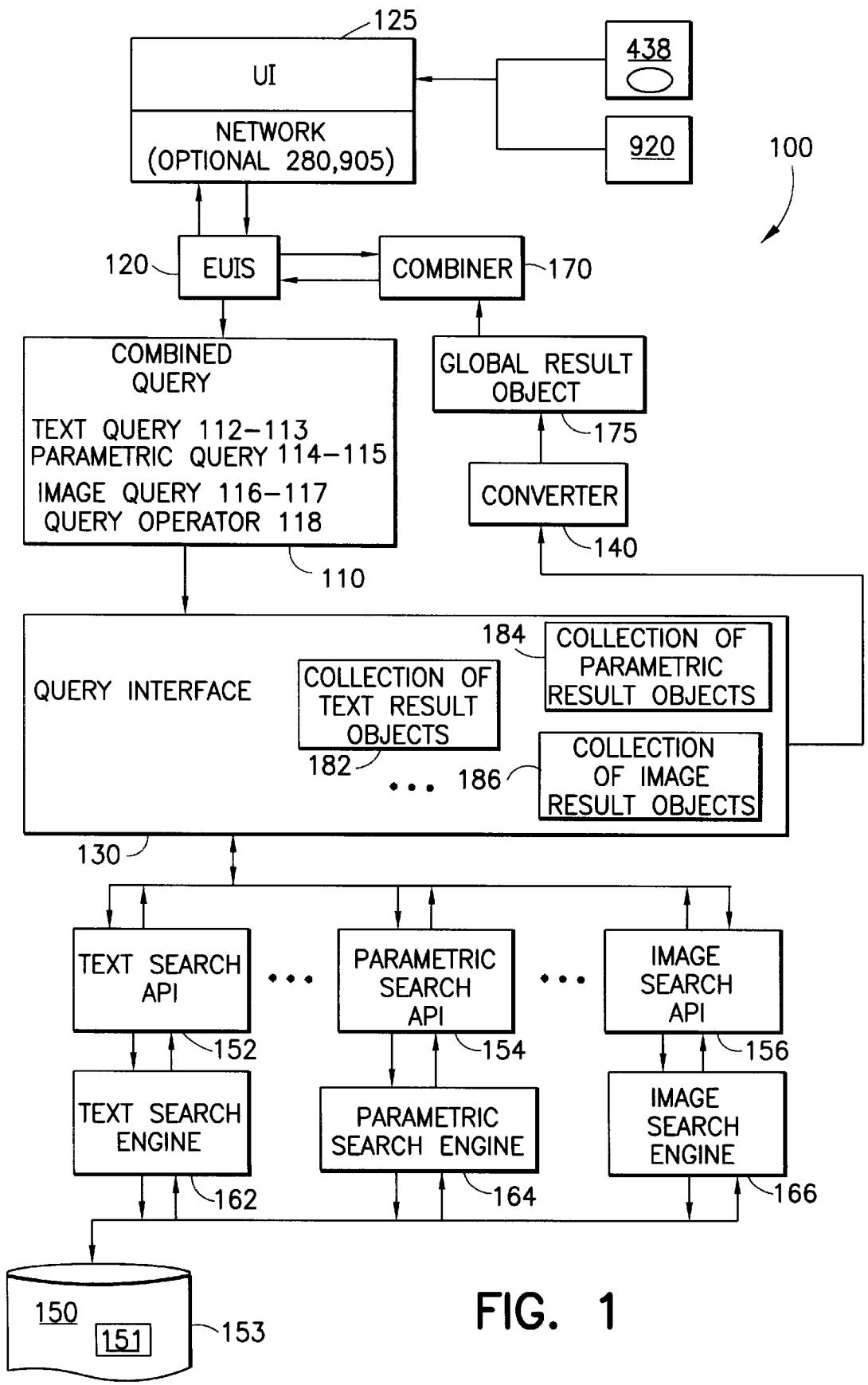
FIG. 1 is a block diagram of the system architecture the invention executing on a single computer and alternatively in a network based architecture.

FIG. 1 is a block diagram of one preferred embodiment of the system (100) that either operates as a single computer embodiment (210) (not connected to the network 280) or as a computer that is connected to a network (280). In the single computer embodiment, the network (280) and network interface (975) are not used and the remainder of the functions are embodied in a single computer or system of computers (210). In the network embodiment, the user interfaces (125) (922, 936, and 934) are connected to a client computer (210) and the client computer (210) is connected through the network interface (975) to the network (280) to the server (990). In this network embodiment, the server (990) performs the functions other then those in block (125, 280, 922, 924, 926, 936, 938, 939, and 975). These hardware embodiments, and their equivalents, are well known.

The system (100) is capable of searching a multimedia database with a single query having more than one media type to produce a single combined result list that conforms to user specified requirements. The system storage (920) stores multimedia information in a database (150) with a plurality of documents (151) each having one or more parts (153). A part (153) is of one single media type. A part (153) can be a piece of text, an image, an image caption, video data etc. For example, a document (151) can represent a book consisting of one or more chapters (text parts 153) and images (image parts 153). As an example, IBM's VisualInfo is such an Object Storage System database (150) with a plurality of multimedia documents (151) each having one or more parts (153) of a single media type. (VisualInfo is a trademark of the IBM Corporation).

Single queries, with one or more media types, are entered through the user devices (e.g. 924, 930) and input adaptors (922, 934) and/or a user interface (UI) (125). UIs (125) are well known.

The UI (125) passes the input to the Enhanced User Interface Support (EUIS) (120) program which stores and processes the user input. A user can use either a single or multiple pages, (e.g., "Windows", "Dialog") to specify a query and other data to specify what type of result list (380) should be returned. It is the role of the Enhanced User Interface Support program (EUIS) (120) to accumulate the various user inputs until enough data is specified to formulate a valid query. This implies that the EUIS stores the state of the user input. The EUIS (120) also parses the query into query objects each having a single media type and each being suitable for a particular search engine (162, 164, 166). These operations are well known.

In the network alternative embodiment, the user interface (e.g. 924, 938) communicates over any general purpose computer network (280) with the EUIS. For instance, in one preferred embodiment, the user interface (125) would be a WWW browser communicating with the EUIS using a CGI script and HTTP protocol. The implementation of such connections are well known. In such an embodiment, the EUIS (120) and the remaining blocks shown in FIG. 1 are on one or more servers (990).

The output of the EUIS (120) is a combined query object (110). The combined query object (110) comprises of one or more query objects (112–117) and one or more query operator objects (118). For example, the combined query (110) can have zero or more text query objects (112), (113); zero or more parametric query objects (114), (115); and/or zero or more image query objects (116), (117). Other media types of query object are possible. Media types (text, parametric, and image) of queries are well known. For example, a text query (112), (113) would be "parallel databases AND NOT IBM." An example of a parametric query (114), (115) would be a Sequential Query Language (SQL) expression. An example of an image query would be certain "hue" or "texture." Further, image queries might include encoded descriptions of features of the desired images, such as average color or texture, or example images which have the required characteristics. The combined query object (110) is an ordered collection of query objects and operators. In a preferred embodiment, the combined query (110) is in form of a data structure shown in FIG. 4. Optionally, this data structure (110) can contain one or more query operator objects (118).

Each query object (112–117) defines a query condition to be satisfied by a set of one or more parts (153) and/or one or more documents (151) of the database (150) that will be returned as part of a collection (202, 204, 206, below) of result objects (182, 184, and 186) of each of the respective search engines (162, 164, and 166). In a preferred embodiment of a collection of result objects, each result object (182, 184, and 186) is preferably represented by a quartet that includes part number, document number, rank and search media type. See FIG. 2 below.

Figures 4, 5:
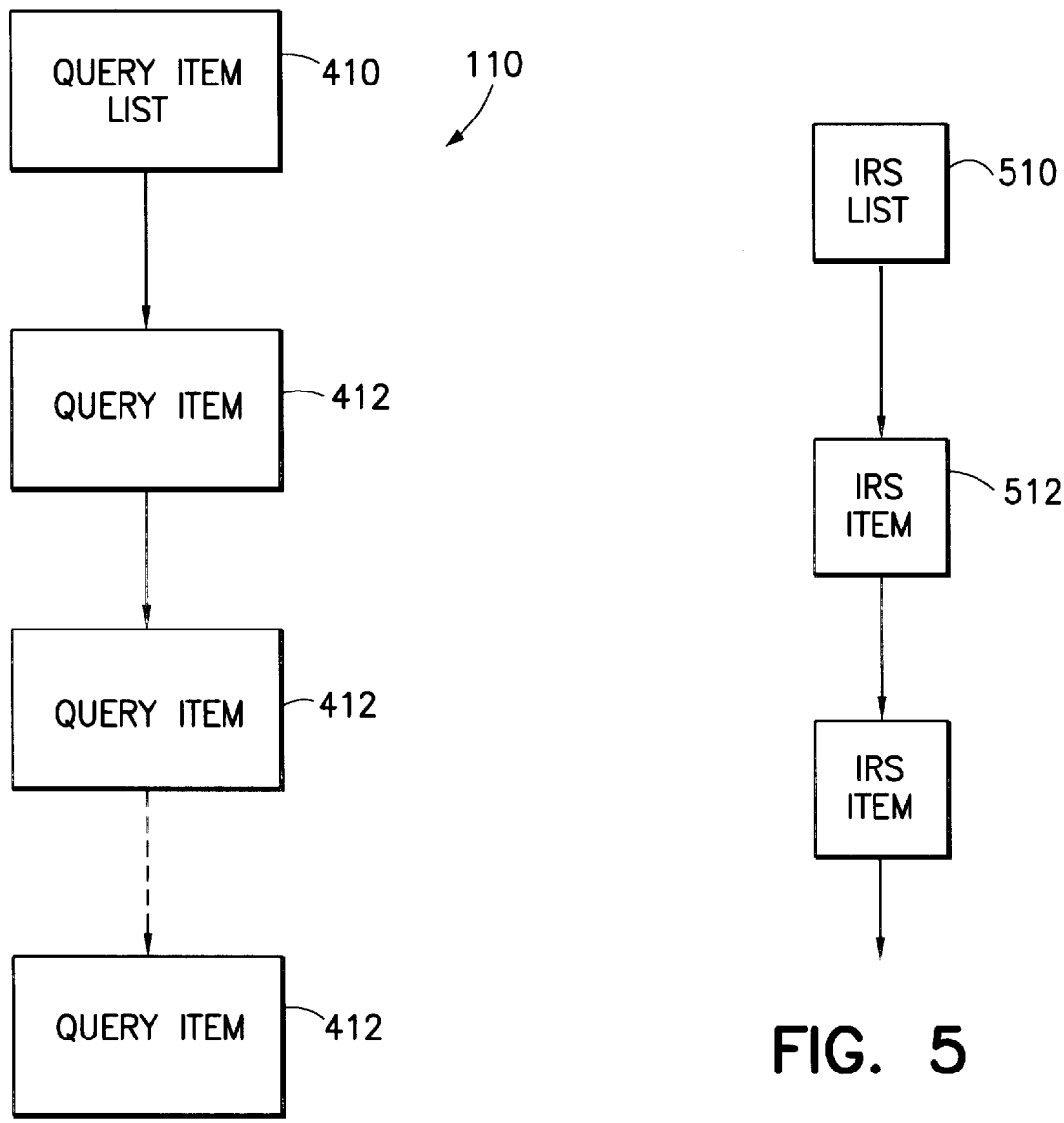
FIG. 4 is a block diagram of a typical query structure.
FIG. 5 is a block diagram of a typical intermediate result structure.

When the user executes the search, the EUIS (120) passes the combined query (110) to the query interface (130). The query interface (130) analyzes each query object (112–117) to determine the media type of the query object and the search engine(s) suited to execute the query object. The query interface (130) also schedules the sequence in which the query objects (112–117) are sent to the respective search engines (162, 164, 166) and coordinates execution of certain of the query operator objects (118). Furthermore, if appropriate, the query interface (130) uses the output of one query to limit the data which has to be searched by another query. The logical operators which are part of the combined query are used for that purpose. More details are shown in FIG. 5.

Each query object (112–117) contained in the combined query (110) is directed by the query interface (130) to one or more of the appropriate search engines (162, 164, 166) capable of executing the query object (112–117) by calls to that engine's application programming interface (API) (152, 154, 156, respectively). The query interface (130) translates each query object (112–117) into a series of API calls to their respective search engines. The query interface (130) provides any formatting necessary to make the query objects (112–117) compatible with the API (152, 154, 156). For example, the text query objects (112, 113) of the query are executed by calls to a text search engine's API (152). There can be more than one text search API's (152) if needed for different text or query types (112), (113). The parametric part(s) (114–115) of the combined query (110) passes through an appropriate parametric search API(s) (154) and the visual or image query objects (116), (117) passes through a visual search API(s) (156). Each query object (112–117) has a type associated with it which is used to create the appropriate API calls.

There are zero or more Text Search APIs (152), Parametric Search APIs (154), and Image Search APIs (156). Typical examples of APIs are the Search Manager Client API for text searches (152), the QBIC API (156) for image searches, and the DB2 and/or VisualInfo API (154) for parametric searches.

Finally, the searches are executed by the search engines (162, 164, 166) by accessing the database 150 of documents 151 and/or parts 153 and/or associated metadata as appropriate. The text search API(s) (152) passes the text query (ies) in a call to its respective text search engine(s) (162), the parametric search API(s) 152 pass(es) the parametric query (ies) in a call to its respective parametric search engine(s) (164) and the visual search API(s) (156) passes any image query(ies) in a call to to its respective visual search engine(s) (166). Examples of the search engines (162, 164, 166) are "Search Manager" for text search, QBIC for image search and DB2 for parametric search.

Each of the search engines (e.g. 162, 164, and 166) returns results. These results are converted into a collection of result objects (e.g. 182, 184, and 186, respectively) by the query interface (130). These results objects are described above and are shown in FIG. 2 below.

A preferred embodiment of a result object is of the form of a quartet comprising:
1. a part number (e.g., 220, 240, 260) 2. a document number (e.g. 222, 242, 262), 3. a rank (e.g. 224, 244, 264), and 4. search engine media type (e.g. 226, 246, 266).

Figure 2:
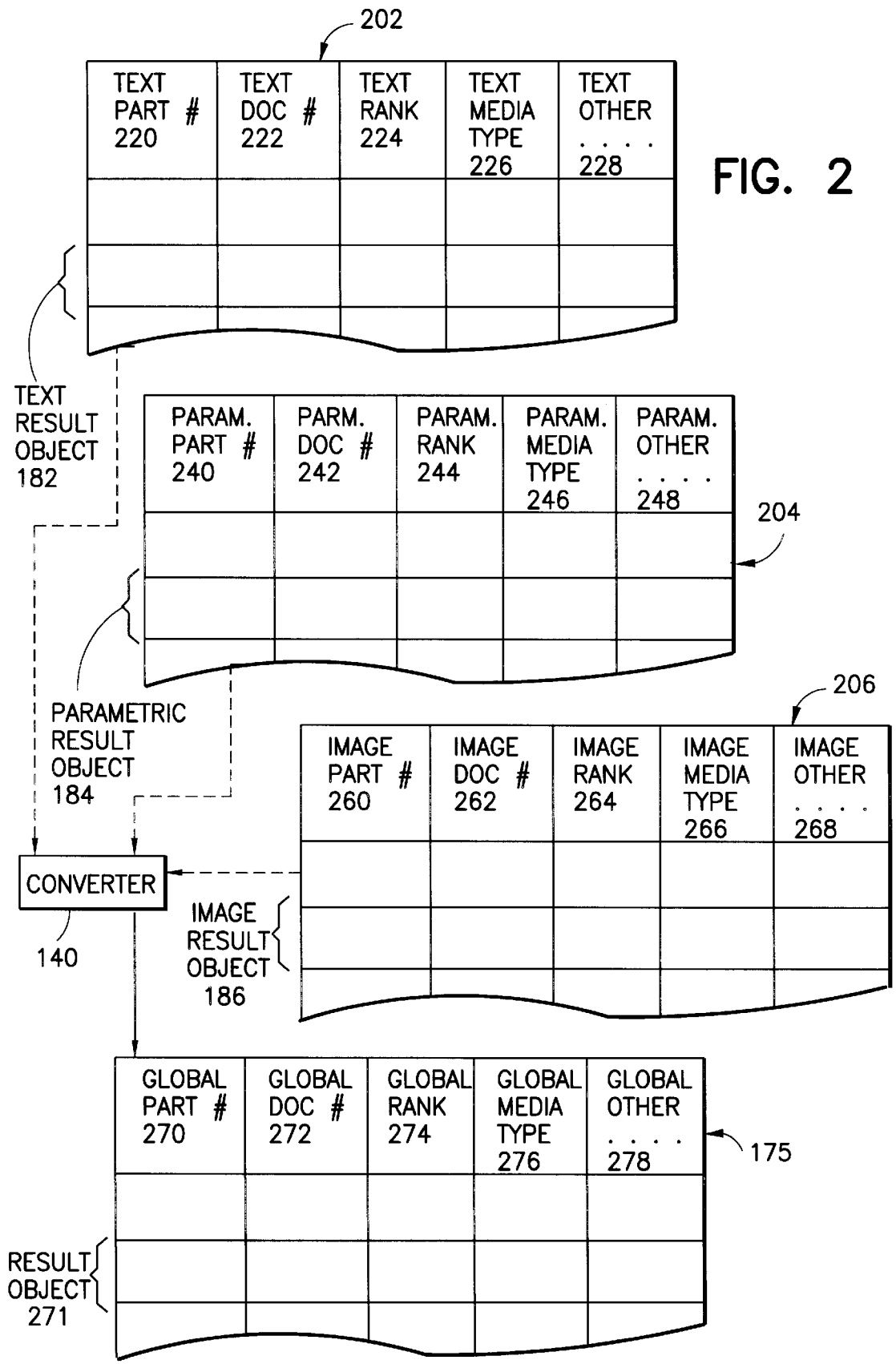
FIG. 2 is a block diagram of result objects and a global result object.

For optimization reasons, more information (e.g., 228, 248, 268) can be included in a result object like attribute values describing the document—this is not shown in FIG. 2 but it is straightforward to add it.

A parametric result object has some particular features: In general the rank associated with a result object is between 0 and 100. However, the rank associated with a parametric result object is always set, e.g., to 100. In general, a document (151) comprises of parts (153) and the search engines return the part numbers (220, 240, 260) of the part which satisfy a query in their results which is used to create the respective result objects (182, 184, 186). However, in case of a parametric query, the search engine(s) return document numbers (242) which satisfy a query. In that case the part number (240) is set to a unique identifier, which is implementation dependent, but could for instance be the string "NULL" to distinguish it from a part number. This identifier would imply that all the parts in the document mentioned in a parametric result object (184) satisfy the query.

A preferred embodiment is to use IBM Digital Library as an object store (database 150) for the data. IBM Digital Library identifies document numbers (222, 242, 262) and part numbers (220, 240, 260).

The converter (140) takes all the result objects as input and creates a global result object (175) which is a collection of the separate result objects. Note that a different embodiment could contain more search engines (162, 164, 166) which search for different media types (e.g. video) or there could be multiple search engines searching the same media type. Each and every search engine returns results which are converted into result objects (182,184, 186 and others). Each and every result object is than included in the global result object (175). The global result object (175) comprises the following fields: a global part number (270), a global document number (272), a global rank (274), a global media type (276) and other optional global information (278). The global part number (270) is generally the part number of a result object, for example, it is the part number (220) for the text result object (182), the parameter part number (240) for the parametric result object (184) or the image part number (260) for the image result object (186). The global document number (272) is generally the document number of a result object, for example, it is the text document number (222) for the text result object (182), the parameter document number (242) for the parametric result object (184) or the image document number (262) for the image result object (186). The global rank (274) is generally the rank of a result object, for example, it is the text rank (224) for the text result object (182), the parameter rank (244) for the parametric result object (184) or the image rank (264) for the image result object (186). The global media type (274) is generally the media type of a result object, for example, it is the text media type (226) for the text result object (182), the parameter media type (246) for the parametric result object (184) or the image media type (266) for the image result object (186). The optional global other field (278) contains any other information deemed necessary.

Furthermore, the result produced by one search engine can be used to limit the scope of data another search engine has to query. This process is facilitated as each query object takes as an optional input a collection of results objects to limit the scope it has to search. For example, assume that the query operator object (118) specified as part of the combined query is the AND operator. This implies that for a part to satisfy the query it has to satisfy the query for all specified query media types. Hence, a combined query could be performed for instance in the following fashion: execute the parametric query and obtain its result, lets call it Rp 184. Rp 184 is an input to the text query object which specifies that only data in Rp should be searched to satisfy the text query. The text query returns now result Rt. Note that Rt is a subset of or equal to Rp. One can proceed sequentially in the above mentioned way to execute the rest of the specified queries.

If for instance the query operator object (118) is an "OR", the scheduling of the different search engines is done differently. A logical operator "OR" implies that a result object should be a member of the global result object if it is a member of any collection of result objects of any search engine. If the query operator object (118) specified is an "AND", a result object is a member of the global result object if and only if it is a member of all the collections of result objects (by media type). For example, only results of a text media type are ANDed together.

In a preferred embodiment, each search engine returns its results to the query interface (130). For the results of each search engine, the query interface creates a collection of result objects like (182, 184, 186). The query interface also performs the scheduling as described in the above paragraphs based on the logical operators. If the logical operator is "AND", the query interface 130 sends the query sequentially to each search engine, using the result of one search engine as the input to another engine. The order in which the search engines are engaged in the search in that case depends on the type of search engine. For instance, in the case that there is a parametric, a text and an image search engine and the logical operator is "AND", the preferred embodiment would be to send the query first to the parametric search engine, then to the text search engine and then to the image search engine. Only after all the searches are performed, are the result objects (182, 184, 186) send to the converter which forms a global result object.

This type of scheduling is dependent on the search engines (in particular whether they except a scope for their search), the type of queries and logical operators specified. Scheduling and optimization algorithms can be found in the literature, for instance the paper by Ronald Fagin: Combining fuzzy information from multiple systems. The extended abstract of this paper can be found in the Proceedings of the Fifteenth ACM Symposium on Principles of Database Systems, Montreal, 1996, pages 216–226. However, it is important to note that the Search Query Objects (182, 184, 186) are designed that they take as input a collection of result objects. Due to this, design optimization as described above can be performed.

Figure 3:
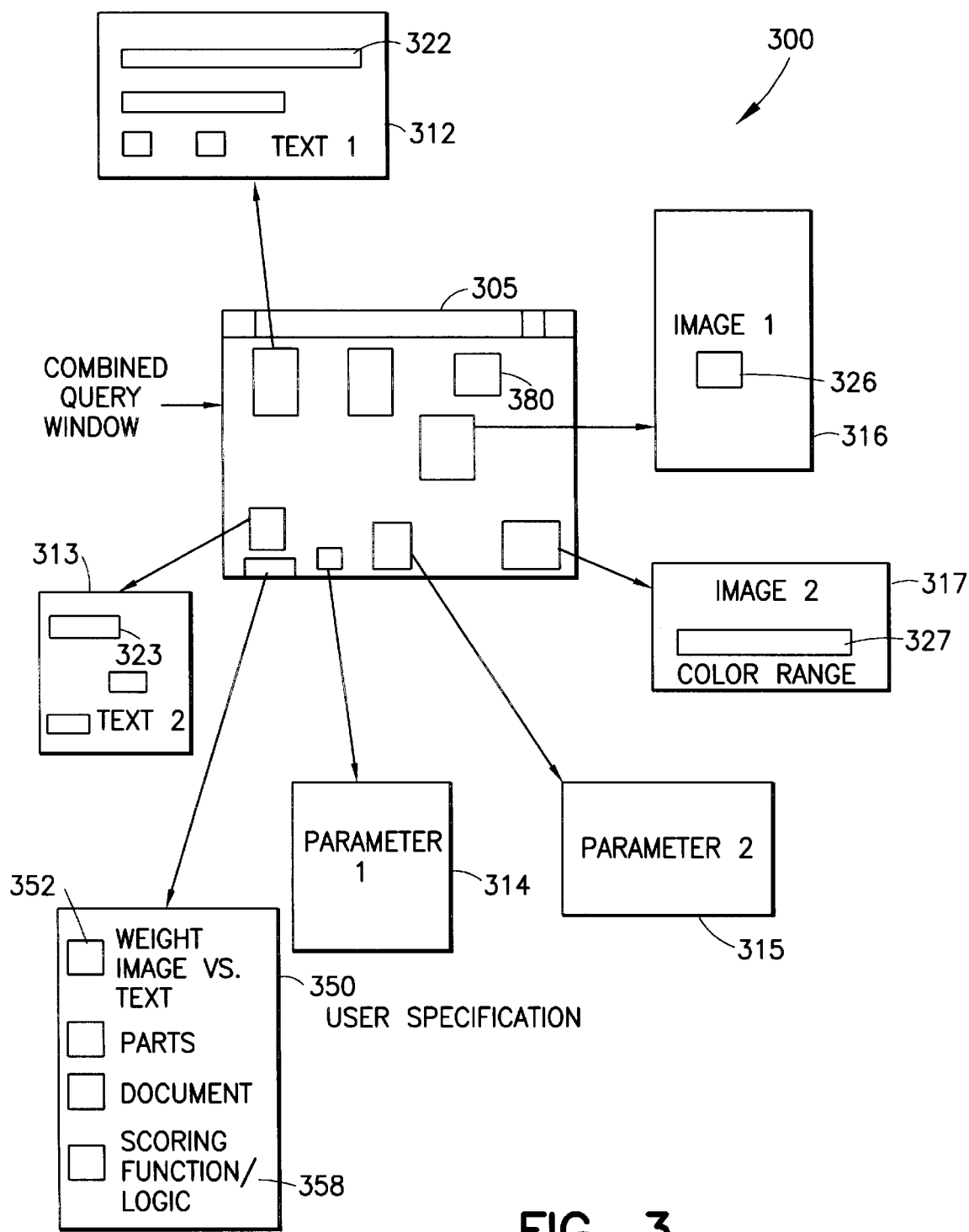
FIG. 3 is a block diagram of a preferred user interface allowing a user to input specifications for searches using different media types in a single query.

FIG. 3 is a block diagram of one preferred combined query entry window (300) displayed on the user interface (126) allowing a user to specify a multimedia query. From the combined query window (300) a user can open windows that allow the user to input query specifications for each media type of query. Furthermore, in the combined query window (300) the user can specify operators and/or functions which should be applied between the results of queries. For example, the user could select that a query should satisfy all of the specified query conditions. However, some of the query conditions are evaluated by a text query engine and some by a parametric query engine. Hence, the results of these two queries has to be "AND'ed" to get the desired final result. For example, a text query (112) would be entered by the user in a window (312) with a specification of the text and logical operators on the text specified in portions of the window (322). In addition, other text media type (113) searches can be specified by the user in other text windows (313) with the specification of the text in logical operators on the text in these windows specified in the window in areas (323). In a similar manner, image queries (116) can be entered by the user in image query windows 316. An image query (116) can be defined using various known methods for defining images. For example, an image query (116) can be defined by certain pattern recognition techniques such as color, histograming, curvature, shape curvature, shape size, texture, etc. (326). Additional image queries (117) can be entered using other image query windows (317). The same image query specifications can be used or other image query specifications (327) can be used. For instance, a range of color (327) may be specified.

Parameter queries are entered by the user, e.g., using parameter query windows like (314), (315). Different parameter search specifications can be entered in any of these windows, for example by entering/selecting desired values and operations in a specified areas on the window. In the same manner, using different parts of the window, the user may have the option to specify the database or which part of a database should be search. Each query part entered by the user may be reflected by a change in the combined query window, for example by the appearance of a graphical icon in the window. All of the above described parts of the user interface which refers to "windows" applies equivalently to Web pages. These techniques are well understood in the prior art.

Another window or part of a window (Web page), called the user specification window (350), lets the user specify in which way the results should be displayed. This window 350 can include input (352) that defines how much weight one media type should have in relation to another. For instance, should parts or documents (which consists of parts or can be also defined as a collection of documents) be shown? Or, how should the rank of a document be determined as a document can consists of parts each of which can be of a different media type and hence each of which will have (potentially) a different rank associated with it? To be able to answer this last question, the user can have the ability to specify algorithms and their parameters to compute the combined ranking of a document. For example, Ron Fagin's paper discusses several algorithms to compute a combined ranking of a document (collection) as a function of the rankings of the members of the document (collection). The importance here is that the user has the ability to specify the desired algorithms and its parameters according to requirements to view the results. Moreover, since the algorithm operates on result objects, the search itself does not have to be repeated to apply different algorithms or their parameters to obtain a different representation of the results as will be explained in the paragraphs below. These settings are referred to as the result viewing object 350.

To recount what was described in the paragraphs above. The results of the different search engines (162, 164, 166) get converted into result objects (182, 184, 186) which then get collected (140) into the global result object (175). This global result object (175) is one of the inputs to the combiner (170).

The combiner (170) takes actually two inputs: the global result object (175) and the result viewing object (350). Based on these two objects it produces a result list (380). If the user then supplies a different result viewing object by changing the settings in a window (Web page) in the user interface, a different result list (380) can be displayed to the user. Let us give some examples:

1) The result viewing object (350) specifies (by the user) that parts (153) should be displayed by media type (276) and within each media type sorted by rank (274). Based on the structure of the global result object (175) it is straightforward to compute the result list for the user.

2) The result viewing object (350) specifies (by the user) that documents should be displayed with a combined rank associated with each document. First the list of possible documents is computed from the global result object by examining the different document numbers (272) specified. Then, the result viewing object specifies that the combined rank of a document should be computed by adding the ranks (274) of all the parts in the document which are ranked (i.e. are part of the global result object) and dividing it by the number of parts used to compute the combined ranking. The result list (380) presented to the user would be sorted by combined rank.

3) The result viewing (350) object specifies (by the user) that documents should be displayed with a combined rank associated with each document (150). First the list of possible documents is computed from the global result object by examining the different document numbers specified. Then, the result viewing object specifies the following algorithm and its parameters to compute the combined ranking: Take the ranks of all parts of a document which have a certain (user specified, e.g. image) type and add the ranks of all the parts and divide by the number of parts involved. The result list presented to the user would be sorted by combined rank.

The Result List (380) can then be embedded in a window or within an HTML page to be presented to the user to be displayed on the user interface (125, 126).

In one preferred embodiment the user interface (125, 126) on the client (210) is a World-Wide Web (WWW) browser such as IBM Web Explorer, and the server (220) is a WWW server. Examples of the Network (280) are the Internet, a local area network (LAN), and/or a Wide Area Network (WAN).

FIG. 4 is a block diagram of one preferred data structure, the Query Item List (400) used by the system for storing the queries in a Combined Query (110). This is a linked list of Query Items (412). A Query Item (412) contains either a single Query Object (112–117) or a Query Operator Object (118). A Query Object can be one of a Text Query (112), a Parametric Query (114) or an Image Query (116). A Query Operator Object (118) describes any logical operation which can be performed on Results of performing a query such as AND, OR, AND NOT, OR NOT and parenthesis or a function which can be performed on Results. The order in which the Query Objects and the Query Operator Objects (118) are listed in the Query Item List (400) is the order in which they are placed in the query, e.g. (312–317). In a preferred embodiment, the list describes a series of queries and logical operations in Reverse Polish Notation (RPN).

Figure 6:
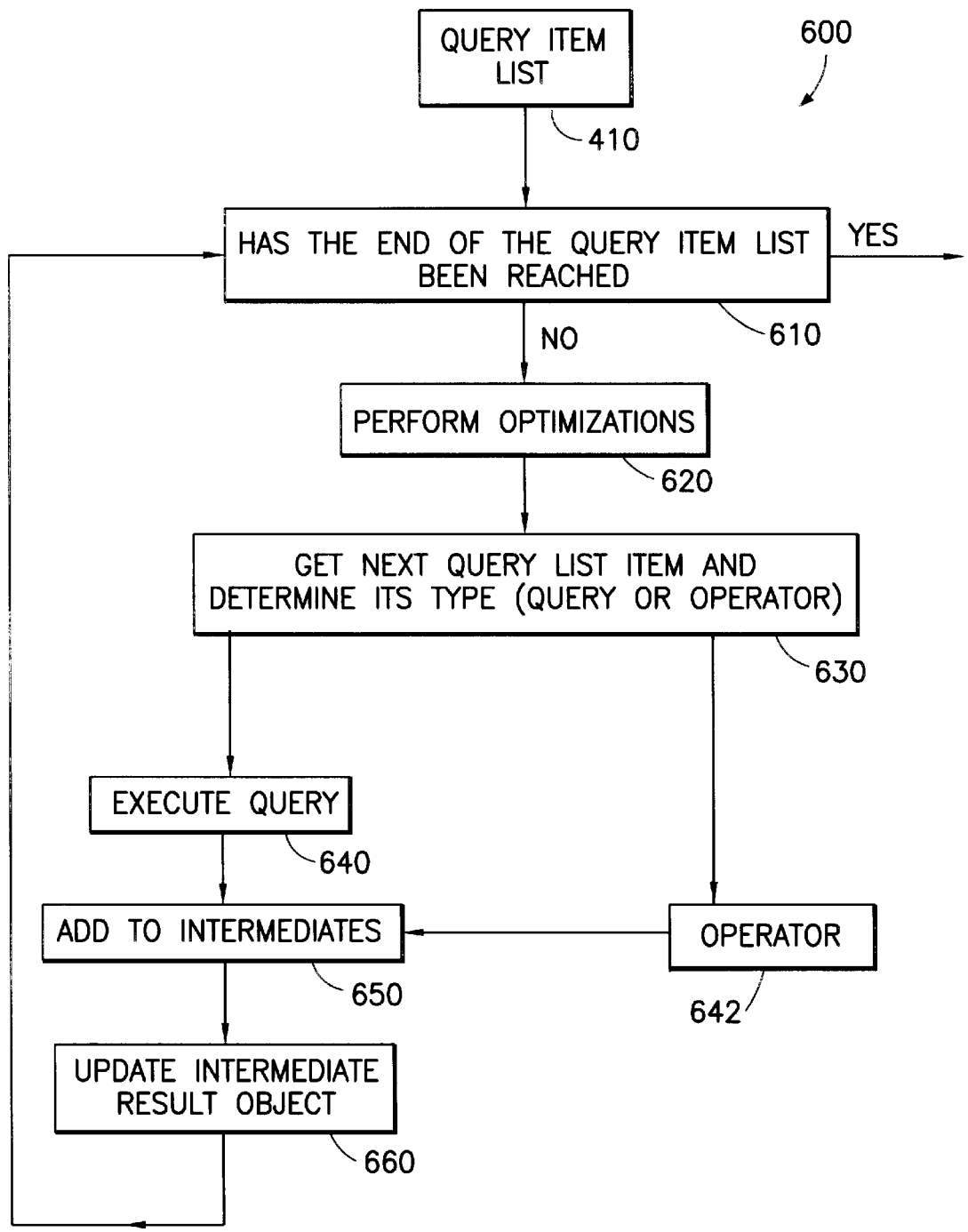
FIG. 6 is a flow chart showing the steps performed by the query interface.

FIG. 5 shows a block diagram of a preferred embodiment of an intermediate result structure (abbreviated as IRS). It is a linked list (510) of IRS Items (512). An IRS item is either a collection of result objects (202, 204, 206) or an operator. The operators would typically include but are not limited to the following operators (, ), AND, OR, AND NOT, OR NOT. In special cases the operator could also be a function which can uniquely be defined to operate between two collections of result objects. FIG. 6 shows how such an intermediate result structure is created.

FIG. 6 is a flow chart showing the steps performed by the query interface 130 in executing a query. Each item (412) in the Query Item List (400) is processed in turn. A Query Item (410) is examined (610) to determine if all the items have been processed. If the last list item (410) has been processed (600), a collection of result objects (202, 204, 206) is returned to the converter. If not, then optional optimizations are performed in step 620, like restricting the data needed to be searched in the next step. For other possible optimization see for instance Fagin's paper. In step (630) the next item (412) in the Query Item List (410) is examined and its type is determined. If the item (412) is a Query, it is executed in step (640) and returns a collection of result objects (202, 204, 206). This collection of result object is then added to the intermediate result structure (650). If there is no intermediate result structure, one is created in this step. In the next step (660) the current intermediate result structure is examined and updated: If the last three elements in that structure are—in that order—a collection of result objects (202, 204, 206), an operator, and another collection of result objects (202, 204, 206), the operator gets applied between the document number columns of the result objects. If the last three elements do not satisfy this criterion in this path of execution, step (660) just returns the current intermediate result object.

Here is a non limiting example of a preferred embodiment of how to implement applying an operator between two collections of result objects. Note, however, different optimizations and algorithms could be applied. Assume an operator needs to be applied between collection1 of result objects and collection2 of result objects. First, determine the list of all different document numbers which appear in collection1—lets refer to it as List1, and do the same to collection2 of result objects resulting in List2. Then, apply the operator between List1 and List2 and create List3 of document numbers by applying the operator between each item in List1 and each item in List2. For instance, if the operator is AND, a document number in List1 is a member of List3, if and only if it is also a member of List2. If the operator is OR, List3 is a union of the document numbers in List1 and List2. After creating List3 in the just described manner, use to determine which result objects will remain in collection1 and collection2: In particular, remove all result objects from collection1 and collection2 whose document number is not part of List3.

If the type of the Query List Item (412) determined in step (630) is an operator (642), it gets added to the intermediate result structure (650). In the next step, (660), the intermediate result structure gets updated in the following manner. If the last three elements of the intermediate results structure are—in that order—opening parenthesis, collection of result objects, closing parenthesis, remove these three elements and add the collection of result objects back again to the intermediate result structure. If in step (610) it is determined that the last item in the Query Item List (410) has been processed, then the results list on the top of the stack is returned as the Result (175).

Figure 7:
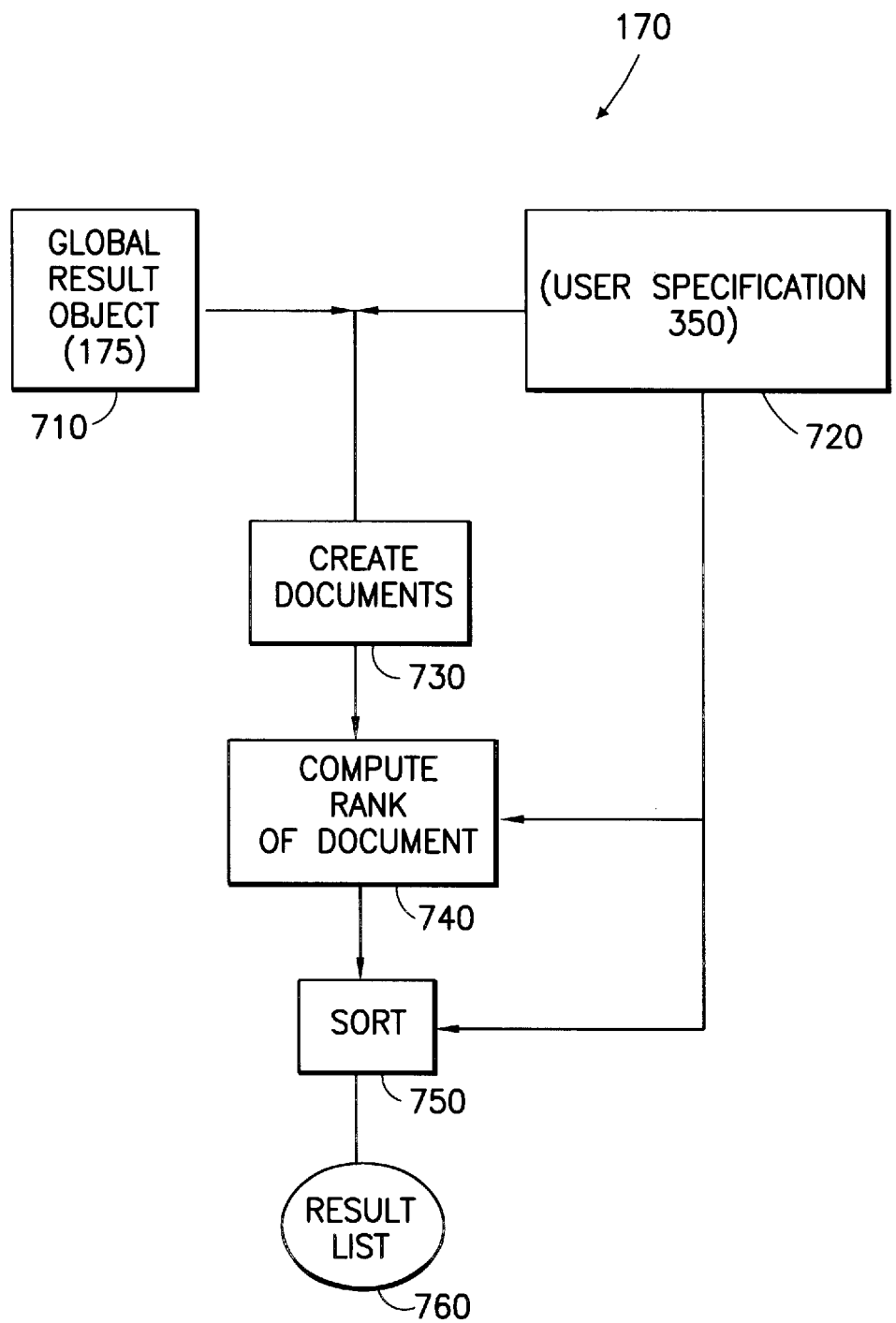
FIG. 7 is a flow chart showing the steps performed by the combiner.

FIG. 7 is a flow chart of one preferred embodiment of the combiner (170) which takes the global result object (710) and the result viewing object (720) as its input. Based on the datamodel specified by the user in the result viewing object (720), it first creates documents (730) from the global result objects. A document could mean that all parts which are members of the global result object and share the same document number are represented by a single document. A document could be equated with parts, which means that each part should be represented by itself. Documents could relate parts which have all the same media type. Furthermore, a a rank is associated with each document. Again, many different algorithms can be used to determine such a combined rank in, step (740). The algorithms are defined and selected by the user and conveyed through the result viewing object. See Fagin's paper for a description of algorithms. If a document is a collection of its parts for instance, a combined rank could be an algebraic average of all its ranked parts. If the user chooses to do so, the results are sorted (750) based on the result viewing object (720) and the result list (760) is then ready to be displayed to the user.

In general, the result viewing object (720) specifies functions to be applied to one or more fields of the global result object. The fact, that the fields of the global result object contain all the information why a particular piece of data satisfies the user specified query, make the specification of the above described functions possible. Examples of functions are: remove duplicates the document field to produce a more concise result list; compute the combined ranking of a document by applying a particular algorithm on all fields which have the same document number and using the corresponding rank fields as inputs to the algorithm.

Given this disclosure, one skilled in the art could develop equivalent alternative embodiments for searching a collection of multimedia documents that contain a mixture of media types using a single query with multiple media types. These equivalent alternative embodiments are also within the contemplation of the inventors.

We claim:

1. A computer system that uses a query with one or more media types to search a database with a collection of one or more multimedia documents, each document having one or more parts, each part being of a single media type, the system comprising:
   a. a graphical user interface allowing a user to enter the query comprising of one or more query conditions each with zero or more logical operators and to further enter a user specification specifying how zero or more results of the query conditions are combined;
   b. a user interface support process that parses the query into a combined query object, the combined query object comprising of one or more query objects and zero or more query operator objects, each of the query objects being of one media type, and the query operator objects determined by the user specification;

c. one or more search engines, each search engine being able to search the collection of documents by one media type;

d. a query interface that calls one or more of the search engines for each one of the query objects according to media type, the search engine executing the query object to produce an interim result object that satisfies the executed query object, each interim result object being a quartet of four fields, the fields being a part number of one of the document parts, a document number of one of the documents, a rank of the document, and the respective media type of the query object, the query interface applying the query operator objects to the interim result objects produced by the respective query objects as defined by the user specification; and e. a converter that combines all the interim result objects in an global result object.

2. A system, as in claim 1, where the system further comprises:

f. a combiner that uses one or more user viewing objects defined by the user specifications to operate on the global result object to produce a result list that satisfies the query according to the user specifications.

3. A system, as in claim 2, where the user specification defines how one or more functions operate one or more of the fields.

4. A system, as in claim 3, where the functions include: sorting, matching, selecting, and ranking.

5. A system, as in claim 1, where the query operator object includes any one of the following: AND, OR, AND NOT, OR NOT, parenthesis, and a function.

6. A system, as in claim 5, where all the query operator objects are AND and hence the interim result object obtained by executing a query object can be used to limit the scope used in executing a next query object.

7. A computer server on a network that uses a query with one or more media types to search a database with a collection of one or more multimedia documents, each document having one or more parts, each part being of a single media type, the server comprising:

a. an interface for receiving a query over the network, the query having zero or more logical operators and further receiving zero or more user specifications into the system, the user specifications specifying how zero or more results of the query are combined;

b. a user interface support process that parses the query into a combined query object, the combined query object comprising of one or more query objects and zero or more query operator objects, each of the query objects being of one media type and the query operator objects determined by the user specification;

c. one or more search engines, each search engine being able to search the collection of documents by one media type;

d. a query interface that calls one of the search engines for each one of the query objects according to media type, the search engine executing the query object to produce an interim result object that satisfies the executed query object, each interim result object being a quartet of four fields, the fields being a part number of one of the document parts, a document number of one of the documents, a rank of the document, and the respective media type of the query object, the query interface applying the query operator objects to the interim result objects produced by the respective query objects; and e. a converter that combines the interim result objects in an interim global result object.

8. A server, as in claim 7, where the server further receives one or more user specifications over the network and the system further comprises:

f. a combiner that uses one or more viewing objects defined by the user specifications to operate on the global result object to produce a result list that satisfies the query according to the user specifications.

9. A method for searching a database of multimedia documents comprising of the steps of:

a. parsing a query into a combined query object, the combined query object comprising of one or more query objects and zero or more query operator objects, each of the query objects being of one media type;

b. calling of one or more search engines to execute the query to produce an interim result object that satisfies the executed query;

c. applying the query operator objects to the interim result objects produced by the respective query objects; and d. combining the interim result objects in an global result object.

10. A method, as in claim 9, further comprising the step of:

f. operating on the global result object with one or more user specifications to produce a result list of documents that satisfy the query according to the user specifications.

11. A system for searching a database of multimedia documents comprising of the steps:

a. means for parsing a query into a combined query object, the combined query object comprising one or more query objects and zero or more query operator objects, each of the query objects being of one media type;

b. means for calling one or more search engines to execute the query to produce an interim result object that satisfies the executed query;

c. means for applying the query operator objects to the interim result objects produced by the respective query objects; and d. means for combining the interim result objects in an global result object.

* * * * *